R. W. RIORDAN.
APPLE CORER.
APPLICATION FILED MAR. 27, 1918.
1,272,107.
Patented July 9, 1918.
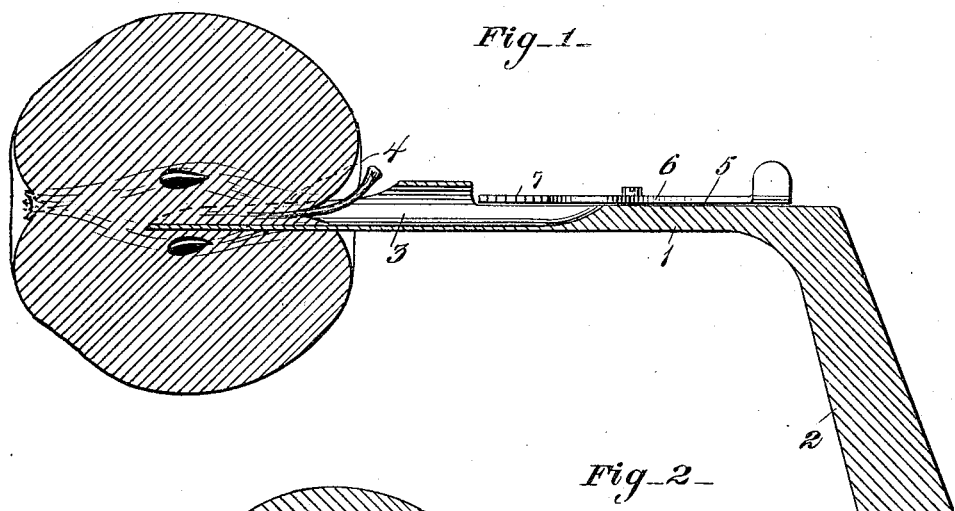
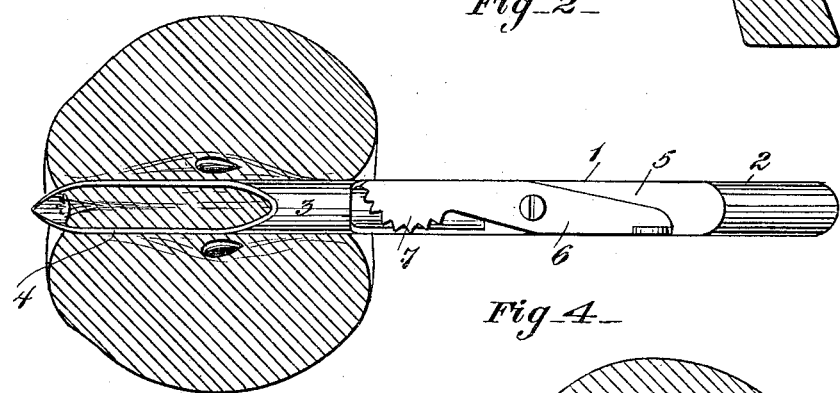
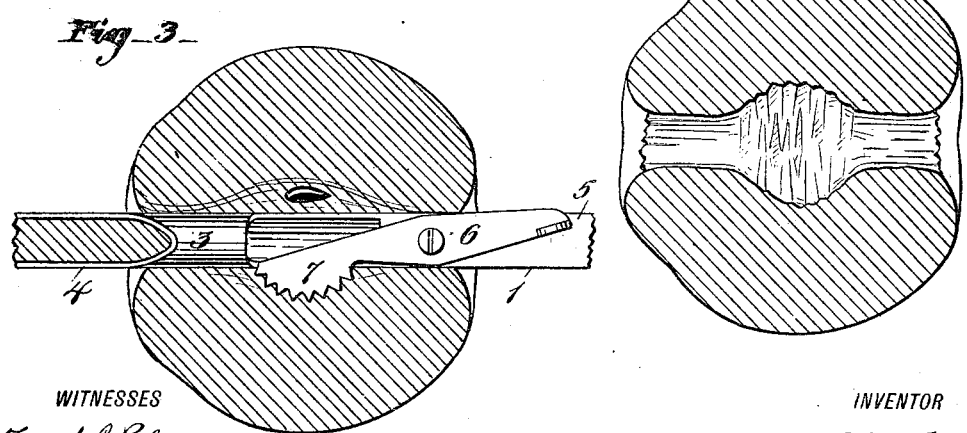
WITNESSES
Frank C. Palmer.
C. Bradway.
INVENTOR
R. W. Riordan.
BY
ATTORNEYS

UNITED STATES PATENT OFFICE.

ROBERT WHITING RIORDAN, OF BROOKLYN, NEW YORK.

APPLE-CORER.

1,272,107.  Specification of Letters Patent.  Patented July 9, 1918.

Application filed March 27, 1918. Serial No. 224,947.

*To all whom it may concern:*

Be it known that I, ROBERT W. RIORDAN, a citizen of the United States, and a resident of the city of New York, borough of Brooklyn, in the county of Kings and State of New York, have invented a new and Improved Apple-Corer, of which the following is a full, clear, and exact description.

This invention relates to an apple corer, and it has for its general object to provide an apple coring device which is so designed that the core can be easily and quickly removed with a minimum waste of the fruit, this result being attained by the use of a secondary cutter in combination with an ordinary round or tubular cutter for the core, whereby the seeds and seed cavities can be removed with a minimum cutting away of the meat of the apple at the stem and blossom regions.

A more specific object of the invention is the provision of an apple corer having a secondary cutter arranged on the shank of the device at a point inwardly from the tubular cutter and mounted on a lever which is adapted to be pressed by the thumb so as to throw the cutting edge of the secondary cutter outwardly when the apple is adjusted on the corer to a point where the secondary cutter is registering with the seed cavities, so that by turning the apple on the corer and simultaneously pressing on the lever, the seeds and seed cavities will be cut into small pieces which are easily removed, partly by withdrawing the corer from the apple and by washing out the core passage with a flow of water.

With such and other objects in view, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of the device partly inserted in an apple;

Fig. 2 is a plan view showing the device inserted far enough to cut the core;

Fig. 3 is a view showing the device fully inserted in the apple, and showing the secondary cutter in operation for removing the seeds and the seed cavity walls; and Fig. 4 is a sectional view of an apple completely cored.

Referring to the drawing, 1 designates the shank of the device, 2 the pistol-like handle rigidly fastened to the shank, and 3 the main or tubular cutter which has a beveled cutting edge 4. The top surface 5 of the shank is preferably flat and lies in a plane substantially coincident with the axis of the tubular cutter, and pivoted on this flat surface is a lever 6 which has its front extremity terminating adjacent the inner or rear end of the tubular cutter, which extremity is provided with a secondary cutter 7 which is approximately semi-circular in plan and may be serrated. The rear end of the lever terminates adjacent the handle 2 and is provided with an upstanding lug or thumb-piece whereby the thumb of the hand gripping the device can be used for throwing the cutter into and out of operative position.

In using the corer it is inserted in the apple in the usual manner or as depicted in Fig. 1, and during this insertion the apple is turned on the corer until the point of the tubular cutter passes out of the apple at the opposite side from the point of entrance. This removes a core of very small diameter so as to minimize waste of the meat of the apple. The corer is now inserted another stage to a point where the secondary blade will be in the equatorial center, and while in this position pressure is applied to the thumb-piece of the lever so as to throw the cutter outwardly from the position shown in Fig. 2 to a position approximating that shown in Fig. 3. This outward movement occurs simultaneously with the rotation of the apple, so that the seeds and walls of the seed cavities will be cut into small particles. The outward movement of the secondary cutter is continued until the cutter encounters no resistance due to the woody or horny parts of the apple. The user soon becomes accustomed as to how long to apply pressure on the lever to force the secondary cutter outwardly. For large apples the secondary cutter will be projected to a greater extent than for small apples, because of the difference in the size of the seed cells. Part of the small particles will adhere to the corer when the latter is removed, while the rest of the particles in the apple can be washed out by running a stream of water from the faucet through the apple.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. An apple corer comprising a shank having a tubular cutter, a lever fulcrumed on the shank at a point inwardly from the cutter, a secondary cutter on the end of the lever adjacent the tubular cutter, a handle connected with the shank, and means on the lever at a point adjacent the handle, whereby the lever can be operated to throw the secondary cutter into and out of operative position.

2. An apple corer comprising a shank having a tubular portion beveled at its extremity and open at its inner end, a lever fulcrumed on the shank and having a second cutter disposed adjacent the open end of the tubular cutter, a handle connected with the shank, and a thumb-piece on the end of the lever opposite from the secondary cutter and located adjacent the handle.

ROBERT WHITING RIORDAN.

Copies of this patent may be obtained for five cents each, by addressing the "Commissioner of Patents, Washington, D. C."